United States Patent [19]

Reneau

[11] 4,012,060
[45] Mar. 15, 1977

[54] BALL FLEX UNION

[76] Inventor: Bobby J. Reneau, Rte. 11, Box 380-B, Houston, Tex. 77039

[22] Filed: Mar. 31, 1975

[21] Appl. No.: 563,373

[52] U.S. Cl. .................................. 285/93; 285/267
[51] Int. Cl.² ......................................... F16L 19/02
[58] Field of Search ............. 285/267, 271, 270, 93

[56] References Cited

UNITED STATES PATENTS

| 787,391 | 4/1905 | Niederlander | 285/271 X |
|---|---|---|---|
| 2,165,164 | 7/1939 | Waters | 285/271 X |
| 2,303,642 | 12/1942 | Hoy | 285/271 X |
| 2,907,593 | 10/1959 | De Phillips | 285/271 X |
| 3,450,421 | 6/1969 | Harwell, Jr. | 285/267 X |
| 3,479,061 | 11/1969 | Smookler et al. | 285/271 X |

FOREIGN PATENTS OR APPLICATIONS

| 1,072,466 | 6/1967 | United Kingdom | 285/271 |

*Primary Examiner*—Andrew V. Kundrat

[57] ABSTRACT

An articulated full gauge opening pipe connector is disclosed. The connector apparatus is particularly adapted for use in under sea applications. The apparatus incorporates a ball which has an axial passage therethrough. The passage opens to the full gauge of a pipeline to avoid constricting flows therethrough. The ball is attached at the end of a short connector pipe preferably terminating in a flange. The ball has a spherical external surface. It stabs into a conforming housing which is formed of a first flange which bolts to an elongate sleeve surrounding a pair of seal members preferably formed of hard material such as bronze. The seal members are preferably pressure actuated to bear against the external surface of the ball. The seals circle the ball, locking it in the tubular housing by positioning the seal members on opposing sides of a plane through the center of the sphere. The seal members open to a space enabling the collection of pressure fluid therein for testing purposes. They are preferably spring loaded against the ball. The tubular housing is assembled to the first flange which in turn is adapted to be connected with a connective pipe terminating in a conventional flange.

5 Claims, 1 Drawing Figure

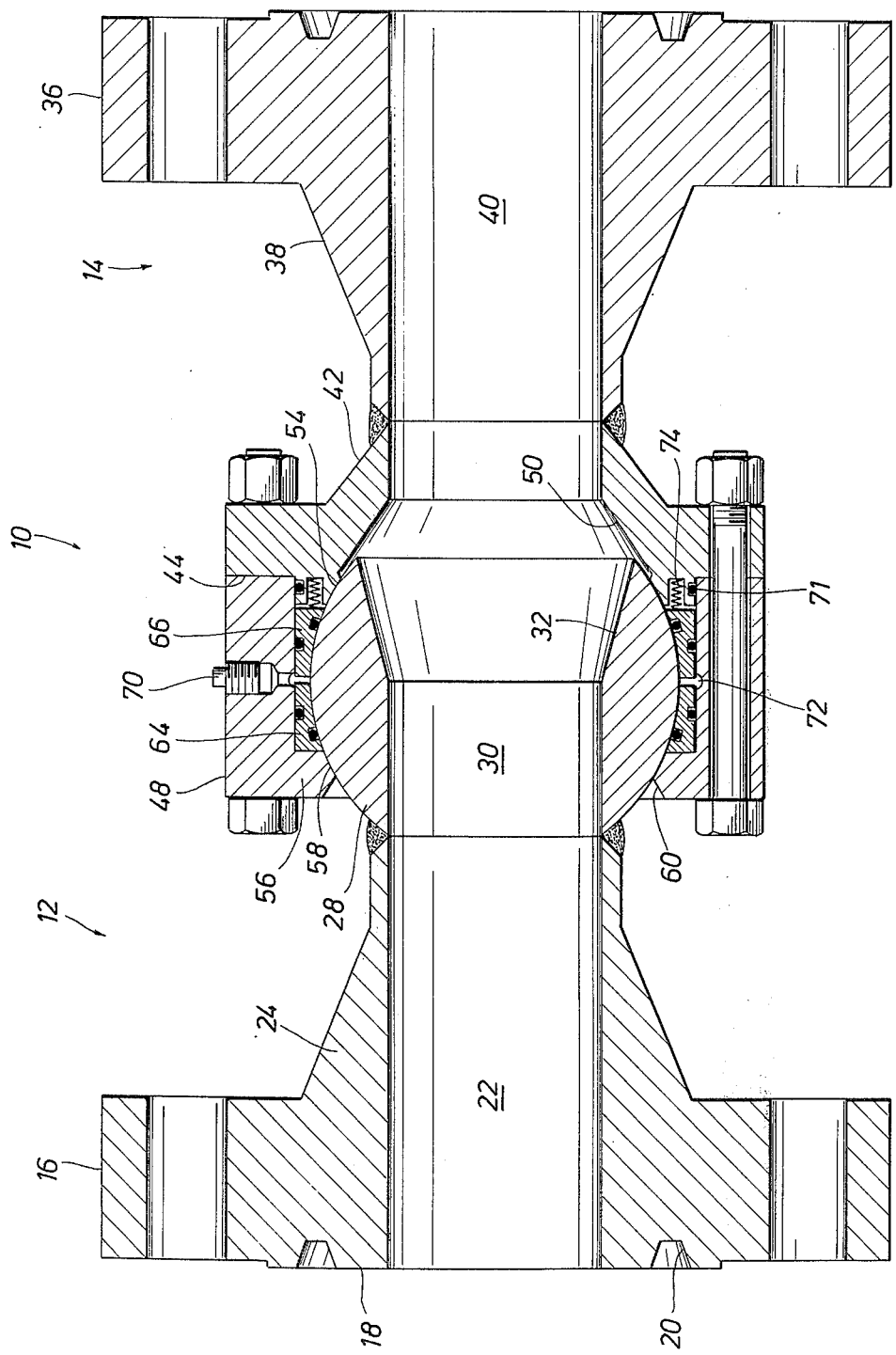

BALL FLEX UNION

BACKGROUND OF THE PROBLEM

In the production of oil and gas from subsea well, the production normally is gathered through several gathering lines which are routed toward a central collection point. Several pipe lines will extend from the near vicinity to a collection point such as a production platform or the like. The gathering lines extend across the bottom in less than precise fashion. Moreover, they may connect to risers extending upwardly to a gathering platform, a loading bouy, or other termination facility. Operating under this handicap, it is unreasonable to expect perfect right angle connections of the gathering lines in other equipment. Moreover, it becomes necessary to accommodate variations in the angular positions of these lines and indeed, some movement even after installation as might arise in connection of a gathering line to a loading bouy which rises and falls with the tide. Such misalignment or movement after connection must be accommodated. The apparatus of the present invention is particularly adapted for this purpose. It is a measurable improvement over equipment known in the prior art. By way of example, this apparatus enables a range of flexure or movement at a subsea connection. In addition, this equipment enables a connection to pivot through a range of deviation from a true axial position. The range of movement permitted is in conic form through a range of about 15° or 20°. The particular range is subject to variation as will be noted.

Provided with the equipment of the present invention, subsea connections can be easily completed without taking measurements to determine the extent of misalignment. By way of example suppose the degree of misalignment is known to be something more than one degree but less than ten degrees or so. The articulated connector of the present invention is able to permit deflection through this range or even an angle as much as 15° or 20°. Thus, the two portions of the present invention are simply installed mated together and they will then assume any angle which may occur. This is particularly advantageous where there is some flexure in one of the connecting pipes. This will occur typically is the situation where gathering lines extend to a floating bouy which is connected to a riser line. The bouy might rise and fall on the variations in tide levels, thereby moving the riser line and thereby changing the relative angle of the riser lines to the gathering lines. This invention accommodates that sort of movement.

SUMMARY OF THE INVENTION

This invention is summarized as an articulated connector for installation in pipe lines that preferably terminates in standard API pipe line flange plates for ease of interconnection. It comes in two portions which are separable until installed. One portion includes a typical flange plate on a short connective pipe terminating in a sphere. This sphere has an axial passage therthrough which opens at one end, thereby providing a full bore opening through the apparatus.

The other portion of the apparatus also terminates in a conventional flange plate for ease of interconnection, supporting the flange plate on a short straight pipe connector. It terminates the short straight pipe connector at an enlarged and tapered flange plate. It is interiorly hollow at a chamfered chamber. This flange plate is adapted to be connected to a tubular housing. The tubular housing is sufficiently large in diameter to receive the ball therein and additionally receive a pair of adjacent seal members of full circle construction which bear against the exterior of the ball to seal against leakage. The chamfered flange plate, the tubular housing and the seals all contact the outer surface of the ball thereby holding it in a captured position but permitting to to rotate and also permitting canted movement away from perfect alignment. The seals are preferably arranged on opposite sides of a plane passing through the center of the sphere to provide opposing forces bearing against the seal member.

DESCRIPTION OF THE DRAWINGS

The single drawing is a sectional view of the articulated connector of the present invention showing details of construction.

DESCRIPTION OF THE PREFERRED EMBODIMENT

The numeral 10 identifies the articulated connector of the present invention. It has a left hand portion 12 and a right hand portion 14. The male connector portion 12 is adapted to be separated from the female connector portion 14. They will be described in the connected state, although it will be appreciated that they are typically installed on different pipes at perhaps different times, and the portions are thereafter joined together to complete the connection. When assembled, an articulated connector is provided which uniquely enables full bore flow through a pipeline through a fitting which is able to flex through a specified conic angle.

The male connector includes an API flange plate 16. It has a face 18 enabling it to be connected with a typical pipe joint terminating in a mating flange plate. Appropriate holes are drilled on a bolt circle in the plate 16 to enable final assembly. A leak proof connection is obtained by placing a seal member in a groove 20 in the face 18. The numeral 22 identifies an axial passage through the flange plate and through a body 24 thereby defining a short connector pipe. The length is subject to variation. It need not be to long because this would make it more cumbersome and difficult to handle. On the otherhand, the length can be varied to as short as appropriate.

The body 24 is welded to a spherical member 28. The spherical member 28 has a hollow axial passage 30 which is aligned with the passage 22. The passage 30 has a matching diameter at the connected end and is flared on the other end at 32 to a larger diameter. The passage 32 flares outwardly to provide a larger than full gauge opening. The ball or sphere 28 has an external surface which is preferably perfectly spherical. The external surface is preferably polished to a specified degree of roughness. It should be machine smoothed and then the surface is ground and lapped to bring the surface to an extremely precise exterior finish, typically in the range of four RMS finish measure.

As will be observed, the flared passage 32 opens one side of the ball 28 to thereby define the flow path through it. It aligns with the female portion 14. The female portion 14 includes a similar or matching flange plate 36 joined to a body 38. The body 38 includes an axial passage 40. The axial passage 40 is of an appropriate length to define a short connective pipe. The passage 40 terminates at the end of the body 38 which is welded to a chamfered flange member 42. The flange 42 flares outwardly. It terminates in a facing shoulder 44. The shoulder 44 abuts against and receives a tubular housing 48. The housing 48 is concentric with the flange 42 and is joined thereto by appropriate nuts and bolts which are threaded through holes drilled in the flange member 42 and in the housing 48 to thereby enable assembly of the two parts.

The flange member 42 has a tapered internal surface 50. The surface 50 flares the passage 40 thereby enabling alignment with the passage 22 and the passage 30 in the ball 28. As illustrated, the male and female parts are perfectly aligned but misalignment through a specified range can be accommodated while enabling full flow through the coupling 10. In the event of misalignment, the flared passage 32 and the flared passage 50 enable full flow through the apparatus.

The flange member 42 will be observed to taper outwardly to define the tapered passage 50. The passage 50 normally does not contact the ball 28 but rather, it defines a flow path which cooperates with the other passages illustrated. The member 42 however does include a circular surface 54 which is curved to conform with the exterior of the ball 28. The surface 54 thus seats against the ball. To this end, it is cut on a common radius with that of the ball.

The tubular housing 48 is tubular along its exterior but it includes an inwardly directed shoulder 56 which terminates at a curved surface 58. The surface 58 is constructed along a common radius with that of the curved surface 54 so that the two of them contact against and conform with the ball 28. They thus define a means which captures the ball. The curved surfaces 54 and 58 are spaced sufficiently apart from one another to enable them to capture the ball 28. The ball 28 is thus placed against the surface 54 and the surface 58 which are located on opposite sides of a plane drawn through the center point of the ball and thereby capture the ball. Rotation of the ball is permitted. Angular deflection of the male portion 12 is likewise permitted through a range which is limited only by the tapered shoulder 60 formed on the tubular housing. Shoulder 60 will be observed to limit travel of the male member 12 to a cone.

Between the curved surfaces 54 and 58 which seat against the ball 28, a cylindrical cavity is defined within the tubular housing 48. It is adapted to receive first and second seal members which are identified by the numerals 64 and 66. They are preferably identical but installed facing one another. They are provided with internal faces conforming with the surface of the ball 28. This enables them to seat on opposite sides of a plane passing through the center point of the ball 28 to thereby provide clamping action. The clamping action is similar to that provided by the surfaces 54 and 58 which forbids axial pushing or pulling of the ball relative to the female portion 14. When assembled the ball is thereby captured preventing axial movement but permitting rotation in two directions.

The seals 64 and 66 as mentioned are identical. Each one preferably has an O-ring on the surface facing the ball 28. The O-ring is received in a groove cut in the face and thus is contacted against the ball 28. In addition, the seals 64 and 66 are received inside the tubular housing 48 and are sealed thereagainst by the provision of an O-ring in a groove. The seals 64 and 66 are free to slide axially of the tubular housing 48 when the ball 28 in not engaged with the female portion 14. Some slack is permitted between them so they can separate slightly as illustrated in the single drawing. A plug 70 received in the threaded opening provides access to an encircling groove 72 formed in the tubular housing. As will be observed, the interior or the tubular housing 48 is cylindrical and hollow to receive the seal members. The groove 72 is formed on the interior. It enables leakage fluid to accumulate so the fitting can be tested by the double block and bleed method. It is not necessary to do this in every case but it is desirable quite often. The plug 70 is removed to permit the introduction of a pressure gauge and the plug thereafter is restored to the threaded opening.

The seal member 66 is forced towards the other seal by a plurality of small coil springs 74 which are arranged in small openings about the flange plate 42. The flange member 42 supports and receives several coil springs typically numbering in the range of three to six in number.

The interconnection between the flange member 42 and the tubular housing 48 is sealed against leakage by an O-ring 71. As will be observed the seal members 64 and 66 and the various O-ring seals which are shown prevent leakage from the connector 10. Any flow in the way of leakage is blocked by the strategic location of the seal members 64 and 66.

At the time of assembly, the seals 64 and 66 are placed in the tubular housing 48. The first seal 64 is installed and then the ball is dropped into the tubular housing 48. The second seal 66 is then placed in the gap between the ball 28 and the tubular housing 48. The ball is at some convenient time welded to the body 24. Alternately, two piece construction of the body and flange is used and the two parts are joined. Thereafter, appropriate nuts and bolts are used to assemble the tubular housing 48 to the flange member 42, thereby completing assembly of the equipment. The nuts and bolts are left loose to enable the ball to rotate rather easily. Installation is then accomplished by joining the flange plates 16 and 36 in the pipeline of interest.

In the preferred embodiment, the ball is smoothed typically to a roughness of four RMS, and it is made of a fairly hard metal. The seals 64 and 66 are preferably formed of a softer metal such as bronze and they are ground and lapped to a roughness of about 4 RMS. The O-rings then are not very significant to sealing which is provided by the seals 64 and 66. The seal members 64 and 66 will provide very good leak prevention without O-rings except for that short interval when the seals 64 and 66 are first contacted against the ball 28. The seals 64 and 66 provide the primary load bearing surface in comparison with the surfaces 54 and 57, which support the ball only after a great deal of wear on the seals 64 and 66 has occurred. The loading on the surfaces 54 and 58 is varied dependent on the lateral forces acting on the seals 64 and 66 which is in part provided by the springs 74.

The foregoing is directed to the preferred embodiment but the scope of the present invention is determined by the claims which follow.

I claim:

1. A pipe fitting for use with non aligned pipes, comprising
   a male member;
   a female member;
   said male member comprising
      a connective pipe portion;

a ball at the end of said pipe portion having an axially aligned passage therethrough and connected with said pipe portion said female member comprising
- a connective pipe portion;
- an encircling housing means having a hollow cylindrical portion which communicates with the connective pipe portion;
- seal means located in said housing means of said female portion, said seal means having two facing portions and jointly having a spherically contoured exposed face for contact against said ball which face encircles said ball and which further permits rotation of said ball in said housing means to continue sealing against leakage, said seal including a means for preventing leakage between said seal means and said housing means;
- said means further being constructed and arranged to clamp said ball in said housing means and limit movement thereof from said housing means except rotation which is permitted;

wherein said housing means includes
- a flanged flared receptacle connected to said pipe portion;
- an axial hollow tubular housing;
- an internal, encircling shoulder on each of said receptacle and said tubular housing, said shoulders having a curved conforming face which captures said ball therebetween; and
- wherein said encircling shoulders are formed on separable members including said receptacle and said housing which align and join together axially about said ball.

2. The apparatus of claim 1 including first and second circular seal means supported by said housing means, said first and second seal means being spaced from one another by a distance to enable them to be positioned on opposite sides of a plane passing through the center of said ball; and wherein said housing means includes a cylindrical hollow tubular member with a pair of internally facing circular shoulders for supporting said seal means therein.

3. The apparatus of claim 2 including a metal face on said first and second seal means which face conforms to the external surface of said ball.

4. The apparatus of claim 2 wherein an opening is formed into said tubular member between the shoulders thereof and said member is constructed and arranged to collect any leakage past said seal means, and said seal means each independently forms a seal with said ball, said opening permitting testing of said seal means by a double block and bleed test.

5. The apparatus of claim 1 including a seal means between said receptacle and said housing.

* * * * *